US006634794B1

(12) United States Patent
Daoud et al.

(10) Patent No.: US 6,634,794 B1
(45) Date of Patent: Oct. 21, 2003

(54) OPTICAL FIBER CONNECTOR ASSEMBLY

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/162,730

(22) Filed: Jun. 5, 2002

(51) Int. Cl.[7] .......................... G02B 6/36; H01R 13/60; H01R 35/00

(52) U.S. Cl. .......................................... 385/53; 439/534

(58) Field of Search .............................. 385/53, 71, 75, 385/97, 98, 99, 146, 147; 439/8, 534

(56) References Cited

U.S. PATENT DOCUMENTS 2,519,933 A * 8/1950 Rouault .................. 174/21 JC
2,971,178 A * 2/1961 Reesby .......................... 439/8
3,915,544 A * 10/1975 Yurtin ........................ 439/786
5,390,272 A * 2/1995 Repta et al. ................ 385/100
5,481,634 A 1/1996 Anderson et al. ............. 385/76
5,719,977 A 2/1998 Lempert et al. .............. 385/60
6,024,498 A 2/2000 Carlisle et al. ............... 385/56
6,064,195 A * 5/2000 Clayton et al. .......... 324/158.1
6,206,581 B1 3/2001 Driscoll et al. ............... 385/78
6,259,850 B1 7/2001 Crosby, Jr. et al. ......... 385/134
6,419,399 B1 * 7/2002 Loder et al. .................. 385/53
6,511,231 B2 * 1/2003 Lampert et al. .............. 385/70

* cited by examiner

*Primary Examiner*—Chandrika Prasad

(57) ABSTRACT

A connector assembly comprises a panel having a plurality of apertures formed therein. Each aperture is adapted to accept a pivot member of a connector. A plurality of flexible members are proximate each aperture. For each aperture, the plurality of flexible members are configured to maintain a centering bias on a connector when such connector is supported in the respective aperture.

19 Claims, 4 Drawing Sheets

100
102
105
2
2
103
$108_{M,N}$
110
$108_{i,j}$
104
109
$108_{1,1}$
106
107

104
$108_{i-1,j}$
$108_{i,j}$
$108_{i+1,j}$
602

OPTICAL FIBER CONNECTOR ASSEMBLY

BACKGROUND OF THE INVENTION

1. Field of the Invention

The present invention generally relates to connectors and, more particularly, to a connector and receptacle assembly having flexible connectors.

2. Description of the Related Art

Presently, optical interconnection devices, such as optical cross-connect units, contain an increasing number of optical connectors. Optical connector panels are being made to increase the overall number of optical connectors that can be mounted in a single fiber closure. As the optical connectors are placed closer together, it is becoming more difficult to manually manipulate an optical connector without adversely affecting the fibers of adjacent optical connectors. For example, the fibers of adjacent optical connectors are subject to over-bending, which can damage the adjacent optical connectors or otherwise deleteriously affect the operation of the adjacent optical connectors.

SUMMARY OF THE INVENTION

Accordingly, the present invention is a connector assembly comprising a panel having a plurality of apertures formed therein. Each aperture is adapted to accept a pivot member of a connector. A plurality of flexible members are proximate each aperture. In one embodiment, each plurality of flexible members is disposed around a respective aperture and each flexible member comprises a cylindrical beam extending from the panel and sloping inward toward the center of the respective aperture. For each aperture, the plurality of flexible members are configured to maintain a centering bias on a connector when such connector is supported in the respective aperture. In this manner, the present invention advantageously decreases the risk that when a connector is processed, the adjacent connectors will be damaged or otherwise deleteriously affected.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiment of this invention and are therefore not to be considered limiting of its scope, for the invention may admit to other equally effective embodiments.

DETAILED DESCRIPTION

The present invention is an optical connection assembly having flexible connectors. In one embodiment of the invention, each optical connector in the optical connector assembly is capable of pivoting at a predetermined angle around a circle. Thus, when the optical connector is being handled or otherwise accessed or processed, the adjacent optical connectors pivot away from the processed connector to provide ample temporary space. The present invention advantageously decreases the risk that the adjacent optical connectors will be damaged or otherwise deleteriously affected by the handling of an optical connector. Although the present invention will be described in the context of optical connectors in an optical interconnect unit, those skilled in the art will appreciate that the present invention can be used with other types of connectors.

Figure 1:
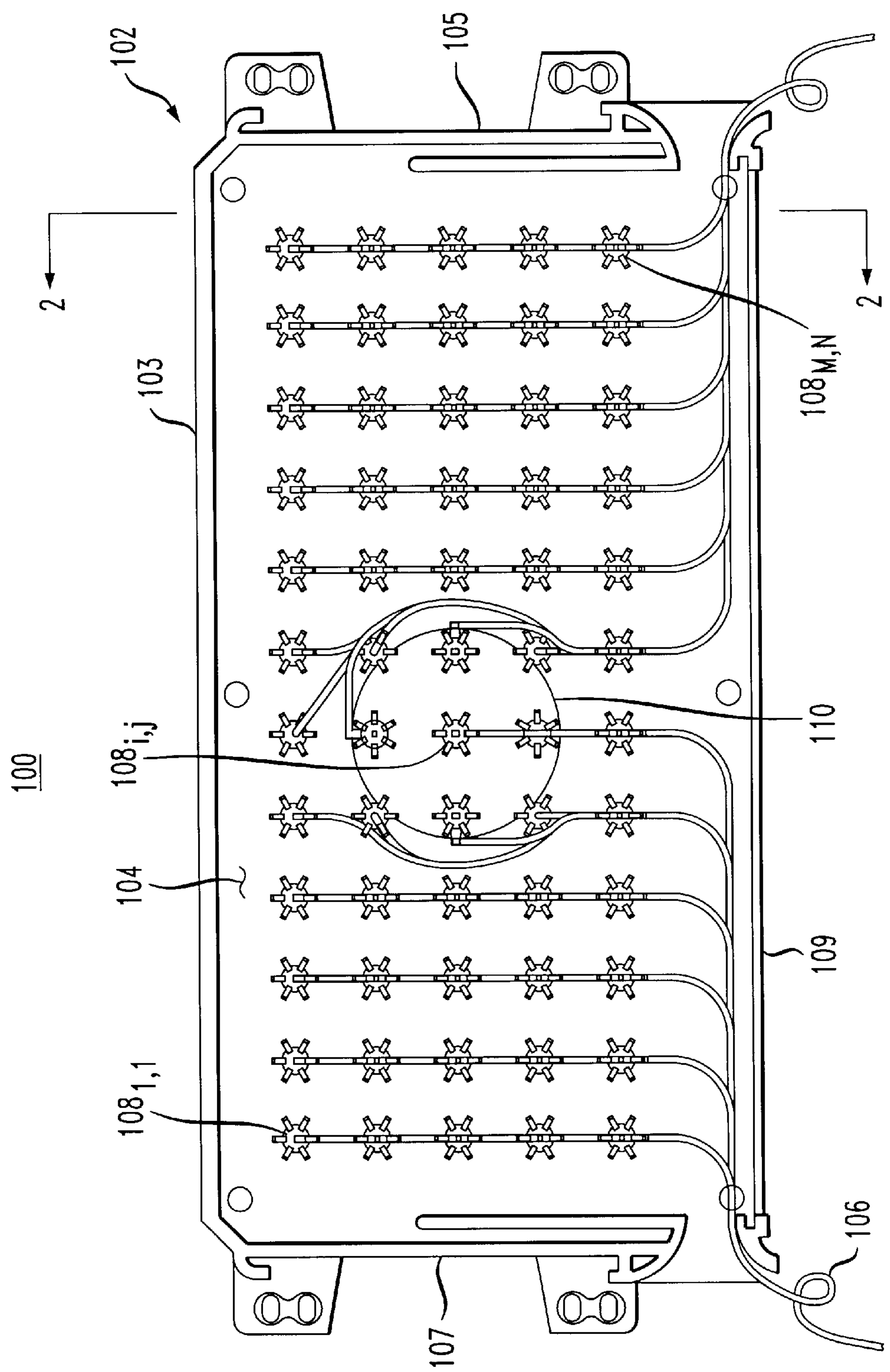
FIG. 1 is a front view of an embodiment of an optical connector assembly in accordance with the present invention.
Figure 2:
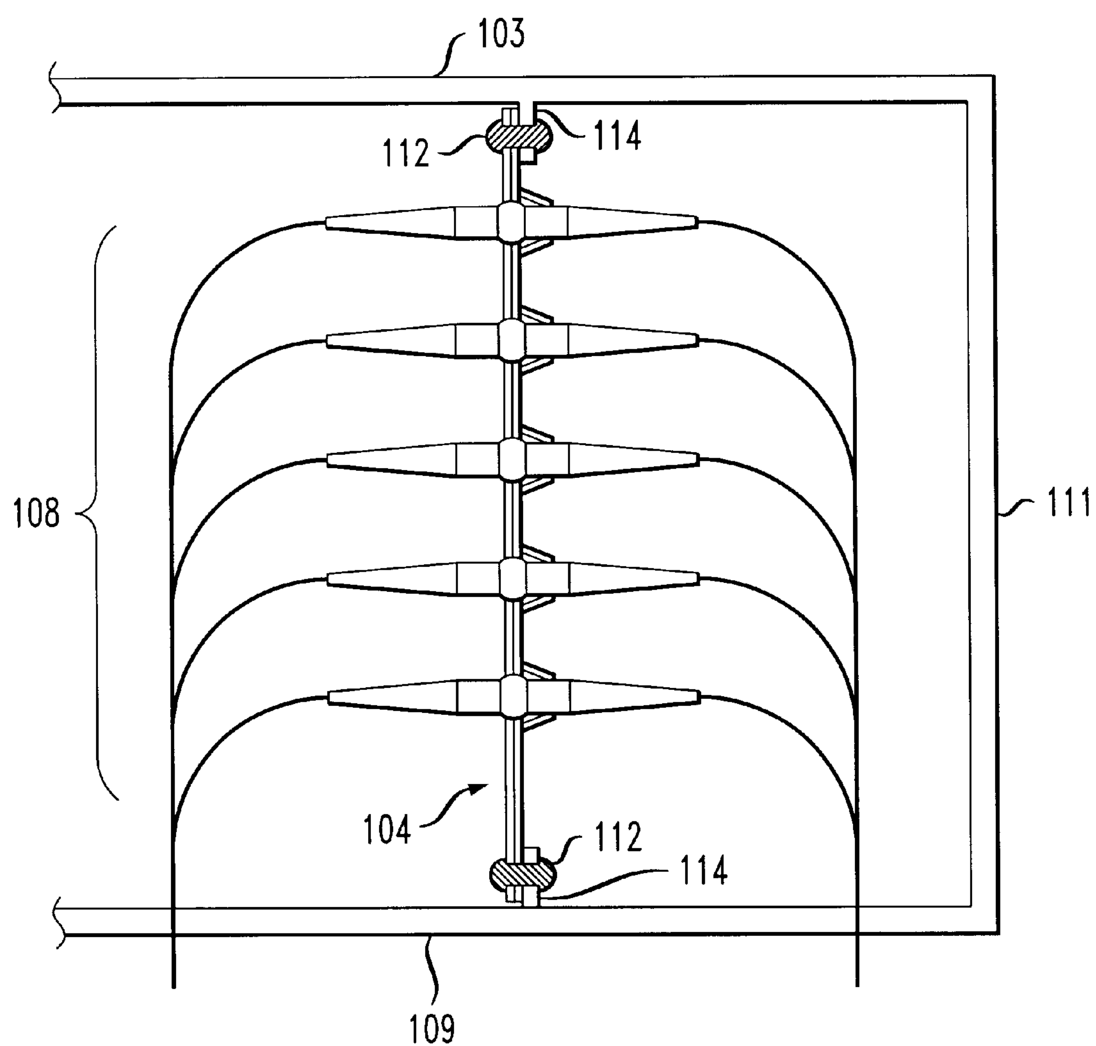
FIG. 2 is a cross-sectional view of the optical connector assembly of FIG. 1.

FIGS. 1 and 2 illustrate an embodiment of an optical connector assembly 100 constructed in accordance with the present invention. In particular, FIG. 1 shows a front view of the optical connector assembly 100, with the front panel removed to show the inner details of the assembly 100. FIG. 2 shows a cross-sectional view of the optical connector assembly 100 taken along the line 2—2 in FIG. 1. As shown, the optical connector assembly 100 comprises a housing 102, a panel 104, and a plurality of optical connector devices $\mathbf{108}_{1,1}$ through $\mathbf{108}_{M,N}$ (collectively 108), where M and N are integers greater than 1. The housing 102 is typically constructed from sheet metal and comprises a top panel 103, a bottom panel 109, a front panel (not shown), a rear panel 111, and lateral opposing panels 105 and 107. The front and rear panels are generally removable or can pivot on hinges to allow access to the panel 104. The housing 102 includes mounting portions 114 for supporting the panel 104. Fasteners 112 are used to fix the panel 104 to the mounting portions 114. The optical connector assembly 100 comprises, for example, an optical interconnect unit, where each of the optical connector devices 108 interconnects two optical fibers from an optical fiber bundle 106.

As described in detail below, the present invention allows the optical connector devices 108 to pivot at a predetermined angle around a 360° circle in the plane of the panel 104. As shown in FIG. 1, optical connector device $\mathbf{108}_{i,j}$ is being processed, resulting in a process area 110. For example, a tool or a technician's hand might process optical connector device $\mathbf{108}_{i,j}$ in order to connect or disconnect a pair of optical fibers. In accordance with the present invention, optical connector devices 108 adjacent to the optical connector device $\mathbf{108}_{i,j}$ that are within the process area 110 will pivot away from the optical connector device $\mathbf{108}_{i,j}$. As such, the present invention advantageously reduces the risk damage to the adjacent optical connector devices 108 when one of the optical connector devices 108 (e.g., optical connector device $\mathbf{108}_{i,j}$) is processed.

Figure 3:
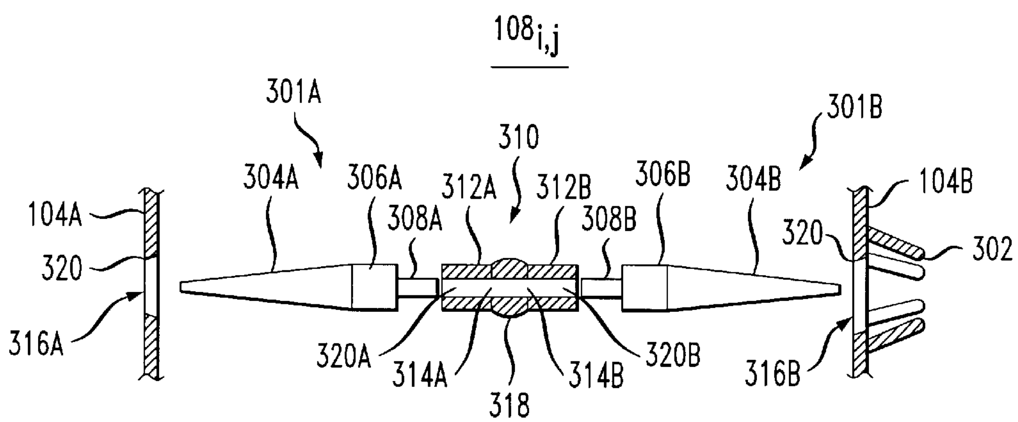
FIG. 3 is an exploded cross-sectional view of an optical connector constructed in accordance with one embodiment of the present invention.
Figure 4:
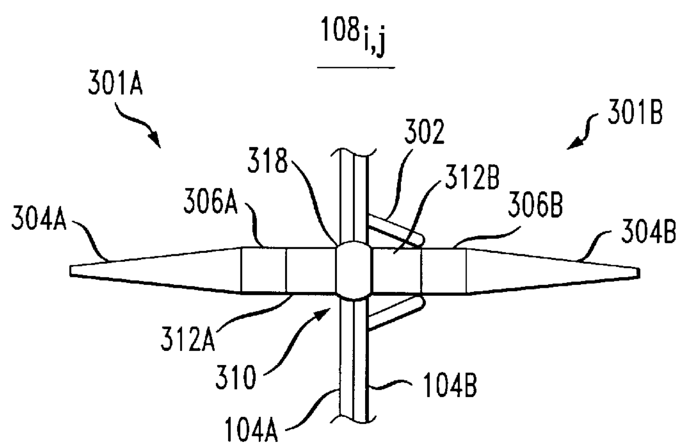
FIG. 4 is a cross-sectional view of an assembled optical connector of FIG. 3.
Figure 5:
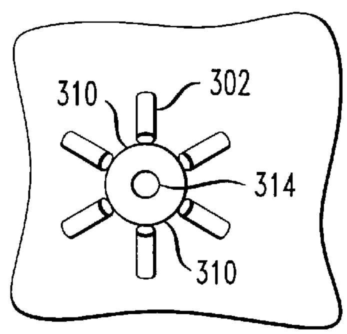
FIG. 5 is an end view of the optical connector of FIG. 4.

The present invention can be best understood by simultaneous reference to FIGS. 3–5. FIG. 3 is an exploded cross-sectional view showing one of the optical connector devices $\mathbf{108}_{i,j}$ constructed in accordance with one embodiment of the present invention. FIG. 4 is a cross-sectional view of an assembled optical connector device $\mathbf{108}_{i,j}$ of FIG. 3. FIG. 5 is and end view of the optical connector $\mathbf{108}_{i,j}$ of FIG. 4. As shown, the optical connector device $\mathbf{108}_{i,j}$ comprises a pivot member 310 disposed between optical connectors 301A and 301B. The panel 104 comprises a first portion 104A and a second portion 104B. The first portion 104A includes a first aperture portion 316A, and the second portion 104B includes a second aperture portion 316B.

Together, the first and second aperture portions 316A and 316B form an aperture 316. The pivot member is pivotally supported in the aperture 316.

In one embodiment, the pivot member 310 comprises an ellipsoidal surface 318, a first port 314A, and a second port 314B. The first and second ports 314A and 314B together form a bore 314 through the center of the pivot member 310. The aperture 316 includes a curved surface 320 adapted to receive the ellipsoidal surface 318 of the pivot member 310. When the pivot member 310 is supported in the apertures 316, the pivot member 310 is capable of pivoting at a predetermined angle 360° around a circle in the plane of the panel 104. The curved surface 320 of the aperture 316 allows the pivot member 310 to pivot, while retaining the pivot member 310 therein.

The present invention can be used with various types of optical connectors, such as ST, SC, FC, LC, and like type optical connectors. In the present embodiment, the optical connectors 301A and 301B respectively comprise bend-limiting strain-relief boots 304A and 304B, connector housings 306A and 306B, ferrules 308A and 308B, and receptacles 312A and 312B. The optical connectors can also comprise additional components and shown, but understood by those skilled in the art, including washers, retainer clips, springs, sleeves, and various inserts. Briefly stated, an optical fiber (not shown) is disposed in a bore within the bend-limiting strain-relief boot 304A and the connector housing 306A. The ferrule 308A is also disposed within the connector housing 306A and mates with the optical fiber. An optical fiber is similarly situated within optical connector 301B. As will be appreciated by those skilled in the art informed by the teachings of the present invention, alternate connectors, such as electrical connectors, can be used with the present invention, such modifications being contemplated by the inventors in accordance with the teachings and goals of the present invention. For example, the present invention can be used with electrical connectors configured to interconnect electrical cords (e.g., an electrical patch panel).

Each receptacle 312A and 312B includes a bore 320A and 320B, respectively, adapted to receive ferrules 308A and 308B. The receptacles 312A and 312B are coupled to the pivot member 310 via first port 314A second port 314B, respectively, such that bores 320A and 320B are axially aligned with bore 314. As such, ferrules 308A and 308B will extend into ports 314A and 314B, respectively, and mate with each other inside the bore 314 of the pivot member 310. The ferrules 308A and 308B mate with each other such that the optical connector device 108$_{i,j}$ interconnects the pair of optical fibers.

The second panel portion 104B also includes a plurality of flexible members 302 mounted to the panel portion 104B and surrounding the second aperture portion 316B. In one embodiment, each of the flexible members 302 comprises a flexible cylindrical beam formed of flexible material, such as plastic. The flexible members 302 can be molded, adhered, or otherwise attached to the second panel portion 104B. Each of the flexible members 302 is sloped inward toward the center of the second aperture portion 316B such that the ends of the flexible members 302 remote from the second panel portion 104B will contact the optical connector 301B when the optical connector 301B is coupled to the receptacle 312B. The flexible members 302 are configured to maintain a centering bias an optical connector 301B. That is, the flexible members 302 are configured to provide a restoring force on the optical connector 301B such that the optical connector 301B remains perpendicular when at rest. The flexible members 302 flex when the pivot member 310 pivots due to a force on optical connector 301A, for example.

Figure 6:
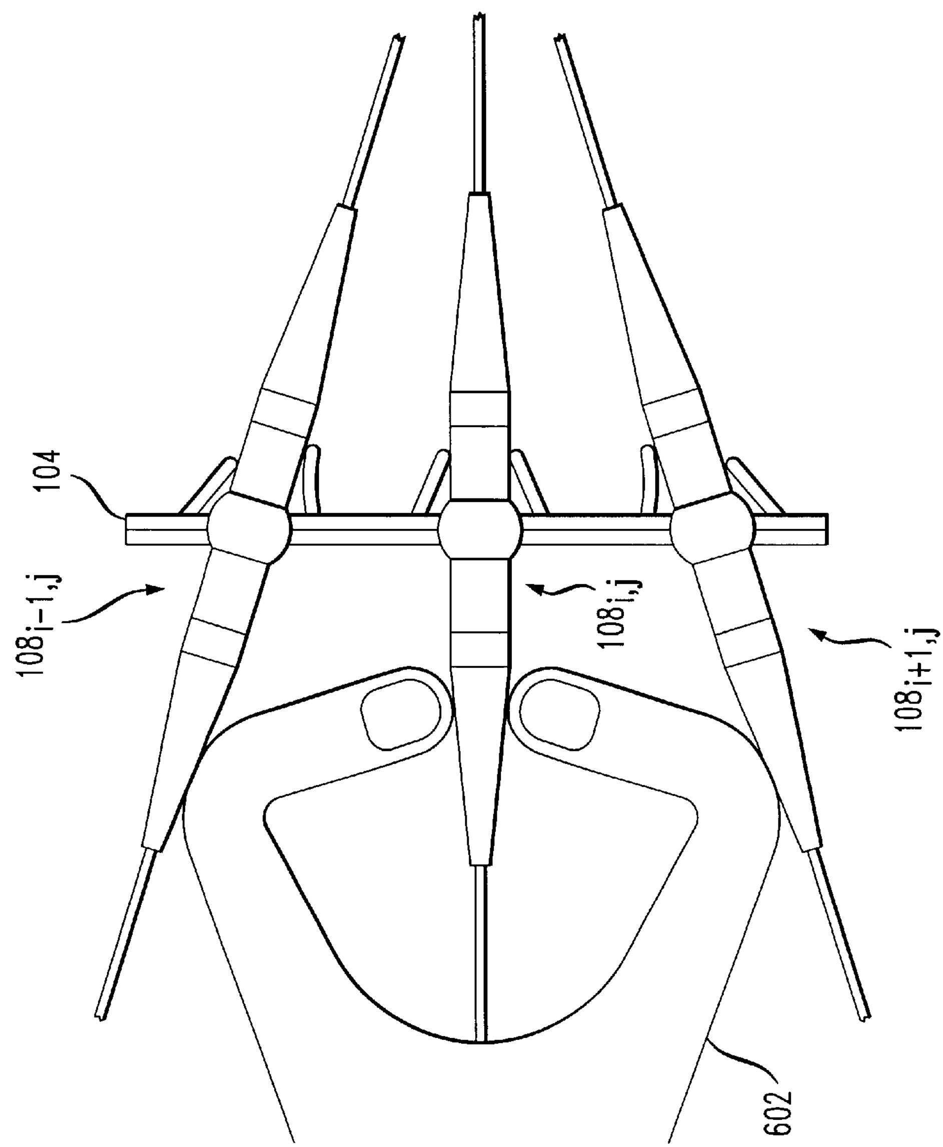
FIG. 6 illustrates operation of the optical connector devices of the present invention.

FIG. 6 illustrates the operation of the optical connector devices 108 of the present invention. In the present example, optical connector device 108$_{i,j}$ is being processed by, for example, a tool or a technician's hand 602. As described above with respect to FIG. 1, the tool 602 results in a process area 110 such that adjacent optical connector devices 108 will be deflected away from the processed connector device 108$_{i,j}$. In the present example, optical connector device 108$_{i-1,j}$ pivots upwards from the processed connector device 108$_{i,j}$, and the optical connector device 108$_{i+1,j}$ pivots downwards from the processed connector device 108$_{i,ju}$.

While the foregoing is directed to the preferred embodiment of the present invention, other and further embodiments of the invention may be devised without departing from the basic scope thereof, and the scope thereof is determined by the claims that follow.

What is claimed is:

1. An optical connector assembly, comprising:

a panel having a plurality of apertures formed therein, where each aperture is adapted to accept a pivot member of an optical connector; and a plurality of flexible members proximate each aperture;

wherein, for each of the apertures, the plurality of flexible members are configured to maintain a centering bias on an optical connector when such optical connector is supported in the respective aperture.

2. The assembly of claim 1, wherein each aperture includes a curved section adapted to receive an ellipsoidal surface of a pivot member.

3. The assembly of claim 1, wherein each plurality of flexible members is disposed around a respective aperture.

4. The assembly of claim 3, wherein each flexible member comprises a flexible cylindrical beam extending from the panel and sloping inward toward the center of a respective aperture.

5. An optical connector, assembly, comprising:

a panel having a plurality of apertures formed therein, and a plurality of flexible members proximate each aperture; and a pivot member pivotally supported in each of the plurality of apertures, each pivot member having a first port and a second port, each of the first and second ports adapted to communicate with an optical connector;

wherein, for each of the pivot members, the plurality of flexibility members are configured to maintain a centering bias on an optical connector when such optical connector is coupled at least one of the first and second ports.

6. The assembly of claim 5, wherein each of the pivot members includes an ellipsoidal surface, and each of the apertures includes a curved section adapted to receive the ellipsoidal surface of a respective pivot member.

7. The assembly of claim 5, wherein each of the pivot members is capable of pivoting at a predetermined angle 360° around a circle in the plane of the panel.

8. The assembly of claim 5, wherein each plurality of flexible members is disposed around a respective aperture.

9. The assembly of claim 8, wherein each flexible member comprises a flexible cylindrical beam extending from the panel and sloping inward toward the center of a respective aperture.

10. An optical connector assembly, comprising:

a panel having a plurality of apertures formed therein, and a plurality of flexible members proximate each apeture; and a pivot member pivotally supported in each of the plurality of apertures, each pivot member having a first port and a second port;

a first optical connector coupled to the first port and a second optical connector coupled to the second port; and wherein, for each of the pivot members, the plurality of flexible members are configured to maintain a centering basis on a respective one of the first and second optical connectors.

11. The assembly of claim 10, wherein each of the pivot members includes an ellipsoidal surface, and each of the plurality of apertures includes a curved section adapted to receive the ellipsoidal surface of a respective pivot member.

12. The assembly of claim 10, wherein each of the pivot member is capable of pivoting at a predetermined angle 360° around a circle in the plane of the panel.

13. The assembly of claim 10, wherein each plurality of flexible members is disposed around a respective aperture.

14. The assembly of claim 13, wherein each flexible member comprises a flexible cylindrical beam extending from the panel and sloping inward toward the center of a respective aperture.

15. The assembly of claim 10, wherein each of the first and second optical connectors comprises:

a receptacle mounted to the respective pivot member, the receptacle portion having a bore disposed therein;

a housing having a ferrule for communicating with the bore in the receptacle; and a bend-limiting strain-relief boot coupled to the housing.

16. An optical connector adapted to be received by an aperture of a panel for passing an optical signal therethrough, said optical connector comprising:

a proximate receptacle, a distal receptacle, and a pivot member positioned therebetween;

the proximate and distal receptacles adapted to cooperate with respective optical connectors;

the pivot member adapted to cooperate with panel portions forming the aperture to be pivotally supported therein.

17. The optical connector of claim 16, wherein the pivot member includes an ellipsoidal surface adapted to cooperate with a curved section of the apeture.

18. The optical connector of claim 16, wherein each of the optical connectors comprises:

a housing having a ferrule for communicating with a bore in the respective receptacle; and a bend-limiting strain-relief boot coupled to the housing.

19. The optical connector of claim 16, wherein each of the pivot members is adapted to pivot at a predetermined angle 360° around a circle in the plane of the panel.

* * * * *